United States Patent
Smith (10) Patent No.: US 7,330,539 B2
(45) Date of Patent: Feb. 12, 2008

(54) METHOD AND APPARATUS TO ALLOW CUSTOMERS TO INITIATE CALL CENTER CONTACT

(75) Inventor: J Timothy Smith, Highlands Ranch, CO (US)

(73) Assignee: Protecticom Corporation, Highlands Ranch, CO (US)

( * ) Notice: Subject to any disclaimer, the term of this patent is extended or adjusted under 35 U.S.C. 154(b) by 458 days.

(21) Appl. No.: 10/905,890

(22) Filed: Jan. 25, 2005

(65) Prior Publication Data

US 2005/0195965 A1    Sep. 8, 2005

Related U.S. Application Data

(60) Provisional application No. 60/550,698, filed on Mar. 5, 2004.

(51) Int. Cl.
*H04M 3/42* (2006.01)

(52) U.S. Cl. ............... 379/201.01; 379/201.04; 379/201.11; 379/201.12; 379/211.01; 379/211.02

(58) Field of Classification Search .......... 379/201.01, 379/201.04, 201.11, 201.12, 211.01, 211.02
See application file for complete search history.

(56) References Cited

U.S. PATENT DOCUMENTS

| 5,557,658 A | 9/1996 | Gregorek et al. |
| 5,884,032 A | 3/1999 | Bateman et al. |
| 6,788,774 B1 | 9/2004 | Caldwell et al. |

OTHER PUBLICATIONS

International Bureau, "Notification of Transmittal of the International Search Report and the Written Opinion of the International Searching Authority, or the Declaration" Aug. 25, 2006.

*Primary Examiner*—Quynh H. Nguyen
(74) *Attorney, Agent, or Firm*—Holland & Hart (57) ABSTRACT

A network operation center is provided. The network operation center provides a message to a customer over a communication link and waits for a reply to the message from the customer. When the reply is received, the network operation center determines whether the reply indicated the customer is receptive to contact from a call center. If the reply indicates the customer is receptive, the network operation center provides a notification to the call center along with customer contact information. The call center contacts the customer based on the notification.

53 Claims, 6 Drawing Sheets

METHOD AND APPARATUS TO ALLOW CUSTOMERS TO INITIATE CALL CENTER CONTACT

RELATED APPLICATIONS

This application claims the benefit of U.S. Provisional Application 60/550,698, filed Mar. 5, 2004, titled METHOD AND APPARATUS TO ALLOW CUSTOMERS TO INITIATE CALL CENTER CONTACT, incorporated herein by reference as if set out in full. This application also is related to U.S. Design Patent Application No. 29/222,148, filed Jan. 25, 2005, titled TWO WAY PAGER, which is a continuation-in-part of U.S. Design Patent Application No. 29/200,652, filed Mar. 1, 2004, titled TWO WAY PAGER, now U.S. Design Patent Des. D503,167, incorporated herein by reference as if set out in full.

FIELD OF THE INVENTION

The present invention relates to companies that solicit customer orders using call centers or telemarketers (generically referred to as call centers) and, more particularly, methods and apparatuses that allow customers to initiate call center contact to place orders, requests, or the like to be fulfilled by the companies.

BACKGROUND OF THE INVENTION

Many companies provide delivery services to customers on a regular basis. For example, medical device companies regularly provide standard orders to customers on a weekly or bi-weekly basis. Many companies deliver groceries, prepared meals, or the like on specified dates and/or times. As used herein, home delivery should be construed broadly to include both products and services as well as commercial and residential locations.

Other companies similarly use call centers for pre or advance purchase options so customers can secure products, such as specialties or discount items. The purchased items may be delivered or held for customer pickup.

For delivery systems, some customers have prearranged deliveries, similar to most milk or dairy delivery companies, but many of the delivery companies simply stop at the customer's address on the prearranged delivery day. During that stop, the customer is presented with purchase options, and the transaction is consummated. Alternatively, some companies allow customers to prepare a list of items they wish instead of and/or in addition to their normal delivery.

Companies allowing pre or advance purchase typically don't have a prearranged delivery network, but solicit purchases from pre-identified customers. For example, Costco provides members with the ability to purchase specialty items.

As can be appreciated, soliciting the order during the delivery stop may be time consuming and is not overly cost effective. Moreover, it is difficult to estimate and load the proper inventory onto the delivery vehicle without some pre-existing knowledge of what the customers on a given route will purchase. For pre or advance purchase of specialties items, it would be beneficial to have a preexisting estimate of expected purchases prior to acquiring inventory.

In the delivery business, instead of stopping for each customer, many delivery companies attempt to solicit preorders from their customers. For example, a frozen meat company may send coupons or postcards soliciting the customer to contact the company and arrange a pre-purchase. A grocery delivery company may call the customer to discuss a grocery delivery for a particular day. Similarly, facsimiles, emails, and text messages could be sent all in an attempt to solicit a preorder from the customer prior to the delivery date so the delivery company can quickly and cost efficiently drop off a prearranged order.

Of course, with today's anti-spam, anti-faxing, and other similar laws, pre-soliciting orders is difficult and potentially illegal. Even without the legal hurdles, pre-soliciting orders is problematic. For example, when calling a customer to solicit a preorder, the customer inevitably receives the call at an inopportune time, such as, for example, during dinner.

Thus, it would be desirable to develop methods, apparatuses, and systems in which the customer can initiate the preorder contact.

SUMMARY OF THE INVENTION

To attain the advantages and in accordance with the purpose of the invention, as embodied and broadly described herein, a method that allows a customer to initiate call center contact is provided. The method includes receiving at a network operation center a message to be transmitted to a customer and transmitting the message. After the message is transmitted, the network operation center waits for a reply from the customer. The network operation center determines whether the reply is received and if the received reply is a positive reply. On indication of a positive reply, the network operation center alerts a call center and provides the call center with customer contact information.

Another aspect of the present invention provides systems to allow a customer to initiate call center contact. The system includes a network operation center for delivering content to a customer and providing instruction to a call center that the customer is receptive to communication. Specifically, the network operation center comprises a transmitter to transmit content to the customer. A receiver at the center waits for a reply from the customer. Once the reply is received, a determinator determines whether the reply is a positive reply. And, on a positive relpy, a notifier delivers a notification to a call center that includes contact information of the customer.

The foregoing and other features, utilities and advantages of the invention will be apparent from the following more particular description of a preferred embodiment of the invention as illustrated in the accompanying drawings.

BRIEF DESCRIPTION OF THE DRAWINGS

The accompanying drawings, which are incorporated in and constitute a part of this specification, illustrate embodiments of the present invention, and together with the description, serve to explain the principles thereof. Like items in the drawings are referred to using the same numerical reference.

DETAILED DESCRIPTION

The present invention will be described with reference to FIGS. 1 to 7. While the present invention will be explained in the context of home grocery and frozen food delivery, one of ordinary skill in the art would recognize on reading the disclosure that the present invention could be used in other contexts, such as, for example, business deliveries, medical supply deliveries, office supply deliveries, consumer household deliveries, and the like. Moreover, home delivery company or delivery company is used generically to refer to any company that solicits pre or advance purchases from customers using a call center to solicit the purchase, such as, for example, membership companies like Costco.

Figure 1:
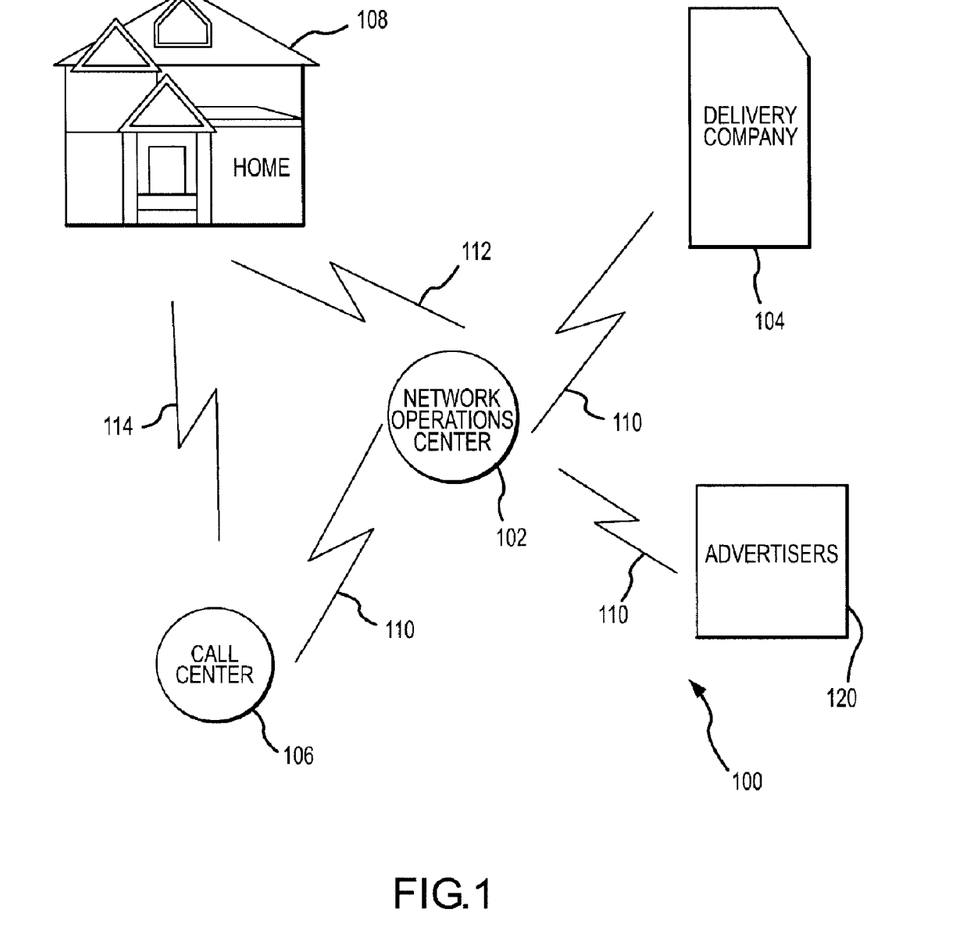
FIG. 1 is a functional block diagram of a system environment consistent with an embodiment of the present invention.

Referring now to FIG. 1, a system 100 consistent with the present invention is shown. System 100 includes a network operations center (NOC) 102, a delivery company 104, a call center 106, and a home (or office) 108. Delivery company 104 as explained above is exemplary and could be other companies that solicit customer orders using call centers whether or not the company actually delivers the purchased product or service to the customer. While shown as separate entities for convenience, NOC 102, delivery company 104, and call center 106 could be a single integrated unit, as desired. NOC 102 could one or more processors and/or servers. First communication link 110 connects NOC 102 to delivery company 104, communication link 112 connects NOC 102 to home 108, second communication link 110 connects NOC 102 to call center 106, and communication link 114 connects call center 106 to home 108. Home 108 could be a residence or commercial location, but is referred to generically as a home for convenience. First communication link 110 and second communication link 110 could be any of a conventional POTS communication link (such as, for example, a telephone connection), a conventional wireless communication link (such as, for example, a cellular connection or pager connection), or the like. It is envisioned that first and second communication links 110 would be network connections, such as, a LAN, WAN, WLAN, Ethernet, Internet, VoIP, or World Wide Web connection. Although envisioned that first and second communication links 110 would be the same, first and second communication links 110 could be different types of links. Communication link 112 could be a conventional wireless, POTS, or network connection, but it is envisioned that communication link 112 would be a wireless connection, such as, for example, a cellular telephone, two-way radio, or a pager connection, such as, for example, a ReFLEX pager, as will be explained further below. Finally, communication link 114 could also be a conventional wireless, POTS, or network connection, but it is envisioned that communication link 114 will comprise a simple POTS style telephone connection, as will be explained below. Although with the advances of VoIP, communication link 114 may be a networked connection such as the above. Further, each of the connections could be one or two ways as needed.

Figure 2:
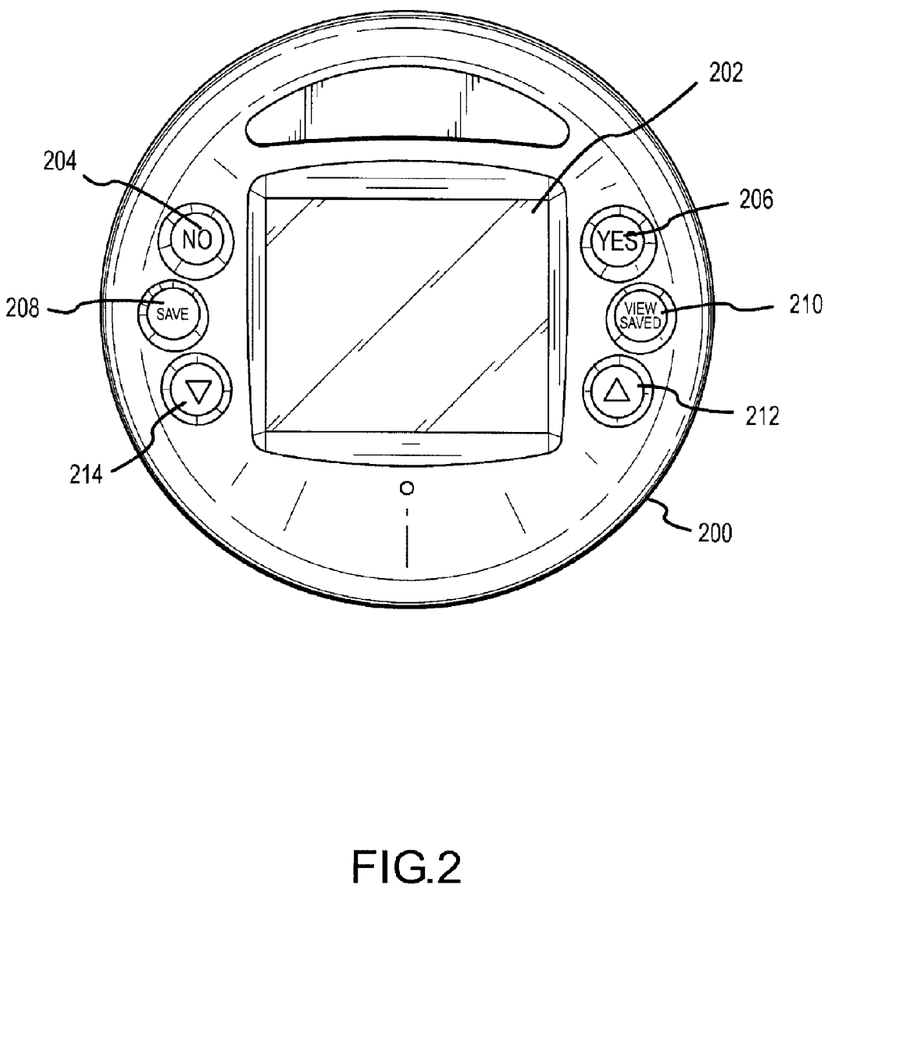
FIG. 2 is a representation of a wireless device associated with the system of FIG. 1.
Figure 3:
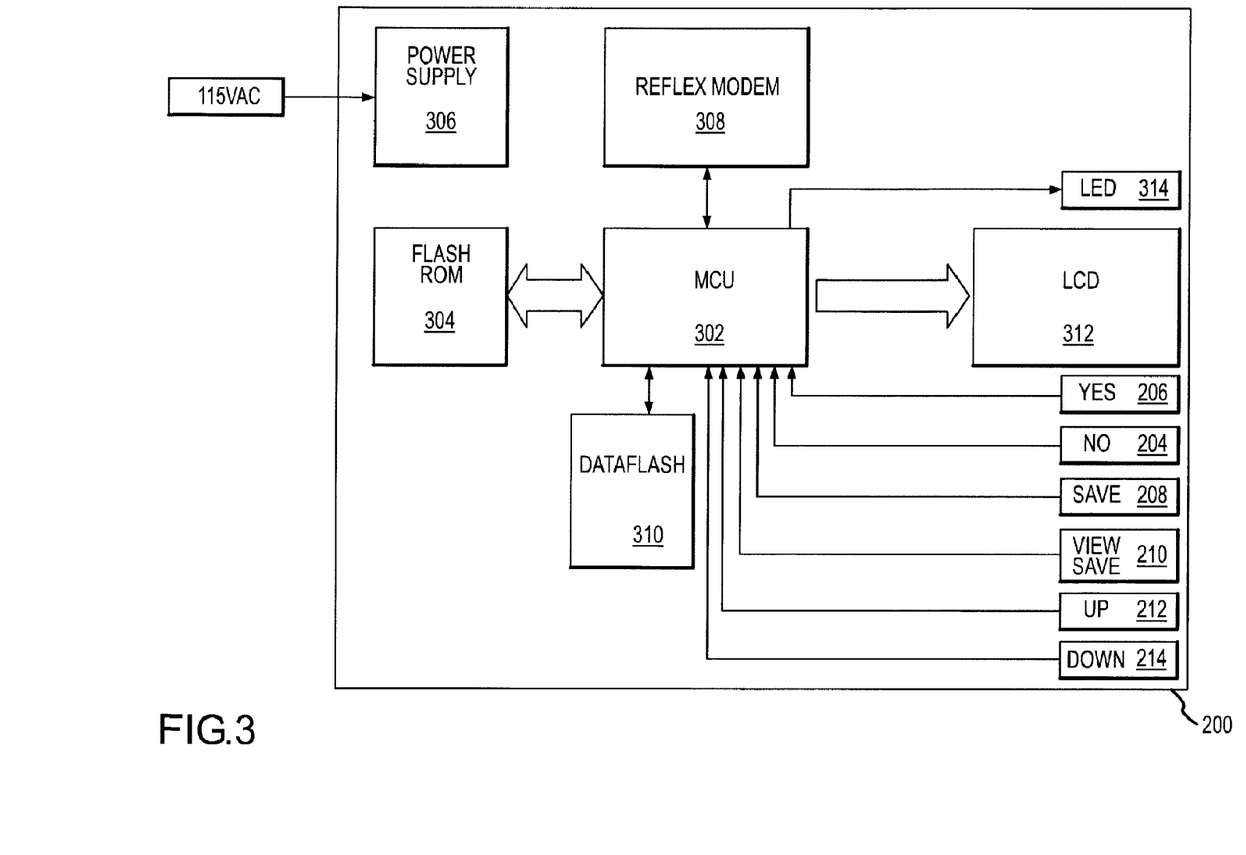
FIG. 3 is a functional block diagram of the wireless device of FIG. 2.
Figure 7:
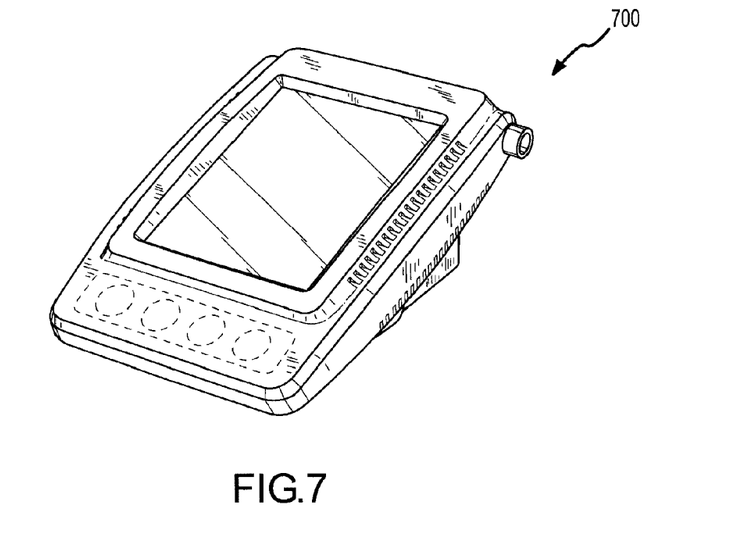
FIG. 7 shows an alternative shape for the device shown in FIG. 2.

Assuming at least a partial wireless system 100, FIG. 2 shows a two-way wireless device 200 that would reside in home 108. FIG. 7 shows an alternative shape for deice 200. Device 200 is capable of receiving wireless transmissions and displaying the transmissions on display 202. (Receiving and transmitting wireless transmissions is conventional and will not be further explained herein). When a message is displayed on display 202, the customer could reject the message using no button 204, accept the message using yes button 206, save the message using save button 208, view a saved message using view saved button 210, and scroll through messages using up and down arrows 212 and 214, respectively. Ideally, the customer's actions (reject, accept, or save) would be broadcast to NOC 102 so NOC 102 could save, record, and deliver demographic data and the like. As can be appreciated, device 200 has a processor, a memory, a transmitter, and a receiver (or a transceiver instead of a separate transmitter and receiver). The internal portions of device 200 are not further described, as the operation of the wireless device for receiving saving, and transmitting messages is generally known in the art. As mentioned above, one possible communication protocol useful for the present invention would be pager technology. FIG. 3 shows the internal portions of device 200 assuming the use of, for example, ReFLEX pager technology. As shown in FIG. 3, device 200 contains a processor 302 (which is shown as a microchip processing unit), a first memory 304 (which is shown as flash ROM), a power supply 306 (which is shown as plug in line voltage, but could be a battery or the like), a ReFLEX modem 308 (which could be other communication protocol devices), a second memory 310, (which is shown as DataFlash memory), an LCD controller 312, buttons 206, 206, 208, 210, 212, and 214, and an LED 314 (which is an optional message indicator light). As these parts are relatively standard in the industry, they will not be further explained herein. Also, the parts are shown separate for convenience and many of the pieces could be combined into a single integrated unit, such as the two memories could be combined into a single memory, the LCD controller could be integrated into the processor, or the like. Further, as one of ordinary skill in the art would now recognize, other communication protocols, such as VoIP, WAP, other conventional wireless protocols, or the like, could be replaced for the ReFLEX technology. Advantages of the ReFLEX technology, or other two way radio technology, include, for example, a delivery vehicle could contain a similar radio transmitter and/or receiver to broadcast updated information to, for example, second memory 310, and/or poll devices 200 to ensure operation during deliveries, which is explained further below.

Figure 4:
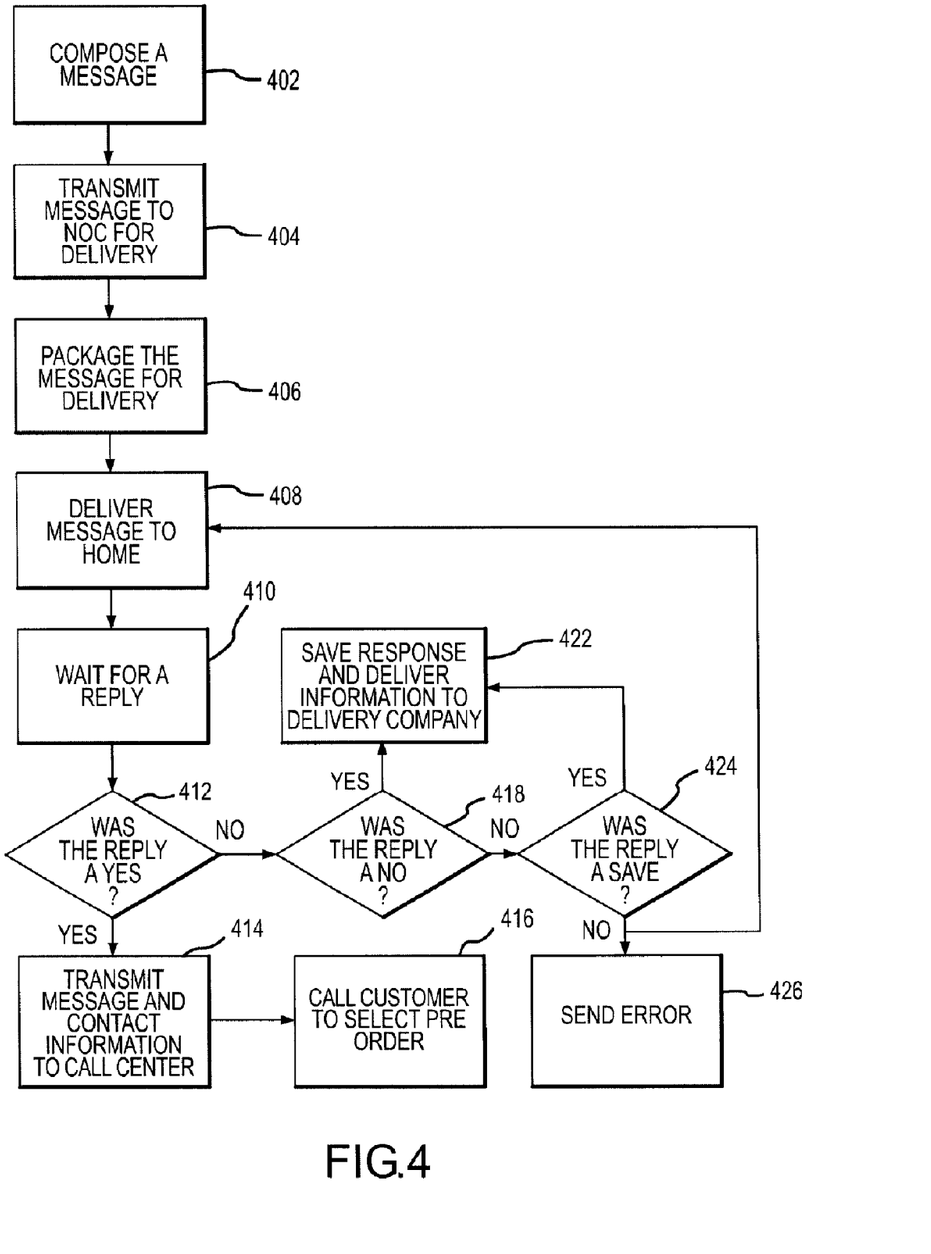
FIG. 4 is a flowchart exemplary of one possible methodology associated with an embodiment of the present invention.

Operation of system 100 and device 200 will now be explained with reference to FIG. 4. FIG. 4 shows a flowchart 400 illustrative of a method of operation of the system consistent with an embodiment of the present invention. The delivery company 104 initially composes a message to be sent to its customers, step 402. The delivery company 104 then transmits the composed message to NOC 102 for delivery, step 404. For example, assuming a network connection between delivery company 104 and NOC 102, the delivery company logs onto the NOC web page and composes a message. Once finished, the delivery company may click on send, ok, or the like, which transmits the message to the NOC for delivery. Once NOC 102 receives the message, NOC 102 packages the message for delivery to home 108 (via device 200), step 406. Packaging the message for delivery could include protocol conversions. In this case, the NOC 102 received the message in a network protocol, such as, HTML. The NOC 102, however, delivers the message to the home using ReFLEX technology, or other wireless technology. Thus, NOC 102 converts the message from a HTML data package into a ReFLEX data package. Once the message is packaged, NOC 102 delivers the message to home 108, step 408. The message could be audio, textual, visual, video, audiovisual, graphical, still images, or the like.

Once any particular message is delivered, NOC 102 waits for a reply to the message, step 410. Optionally, NOC 102 may be programmed to wait for a reply at a predetermined time. If no reply is received within the predetermined time, NOC 102 may be programmed to retransmit the message, record an error, or provide a default message, such as, for example, if no reply is received within 3 hrs of any given message, NOC 102 records the reply as a no (denial or rejection by the customer). As contemplated, the reply to the message would be a yes (accept), no (deny or reject), or save, although much more comprehensive reply messages are possible. For example, device 200 could have a full keyboard in place of the 6 buttons provided. The full keyboard would allow for more comprehensive reply messages. Once the reply is received, NOC 102 determines whether the reply was a yes message, step 412. If NOC 102 determines the message is a yes message, NOC 102 transmits the message and contact information to call center 106, step 414. Call center 106 then places a call to home 108 to solicit a preorder at the customer's request, step 416.

If at step 412 it is determined that the reply was not a yes message, NOC 102 next determines whether the customer sent a no reply, step 418. If the reply is no, NOC 102 saves the information and delivers it to delivery company 104 for their use, step 420. Delivery company 104 may elect to cease sending those types of messages to home 108, modify the message, or continue with the same message at its choice. Delivery of the information to delivery company 104 could be via electronic means (as email, web page access, or the like), facsimile, voice messages, telephone calls, regular postal service, or the like.

If at step 418 it is determined that the reply was not a no message, NOC 102 next determines whether the customer saved the message, step 422. If the reply is a save, NOC 102 saves the information and delivers it to delivery company 104 for their use, step 420. Optionally, if at step 422 it is determined that a reply was not received to the message, NOC 102 can resend the message, step 408, or send an error signal step 426.

While not specifically shown, yes replies can be saved by NOC 102 and delivered to delivery company 104 as well. The compilation of data provides demographic information and the like.

Referring back to FIG. 1, system 100 may also include advertisers 120. Advertisers 120 may contract with delivery company 104 to send a certain number of messages to homes 108. Once established, advertisers 120 would be connected to NOC 102 through a third communication link 110. Again, it is envisioned that communication links 110 would be the same, but they could each be different as desired. The process for advertisers 120 would be similar to delivery company 104. Although advertisers 120 could send a message to which a yes reply would prompt a call from a call center, it is envisioned that yes replies would indicate the customer is interested in receiving or pursuing additional communication and no replies would indicate a lack of interest. NOC 102 would tally this information and deliver it to the third party advertiser 120.

Figure 5:
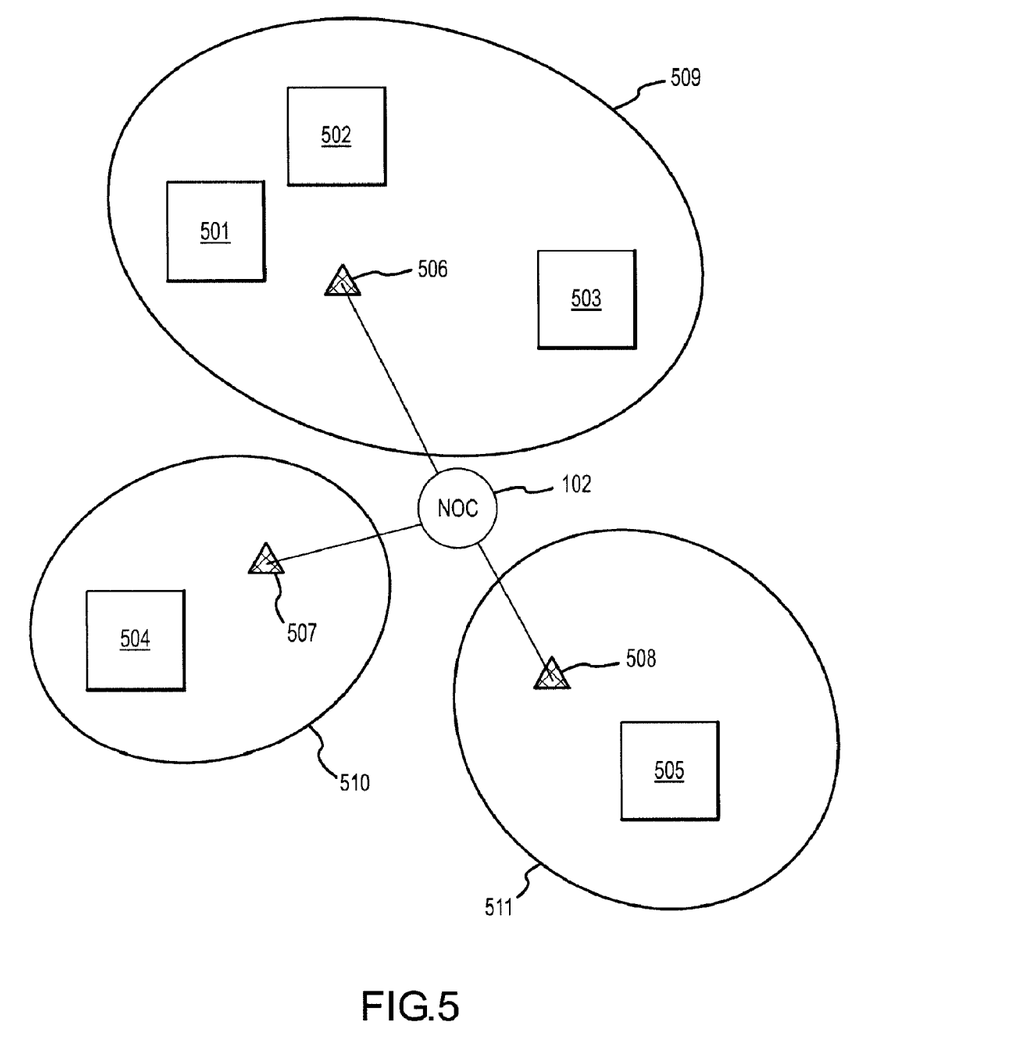
FIG. 5 is a functional block diagram of a region in which the invention of FIG. 1 may operate consistent with embodiment of the present invention.

Referring now to FIG. 5, a functional block diagram of a system 500 operating on a wide area is shown. System 500 includes, for example, a plurality of homes 501-505 and a plurality of transmission towers 506-508. Messages to be delivered to homes 501-505 are sent from NOC 102 to transmission towers 506-508 for broadcast, as explained above for the single home. Homes 501, 502, and 503 and transmission tower 506 reside in area 509; home 504 and tower 507 in area 510; and home 505 and tower 508 in area 511. While delivery company 104 may elect to deliver any particular message to all its homes, if delivery company 104 only wanted to send a message to homes 501, 502, 503, and 504, the message would instruct only transmission towers 506 and 507 to broadcast the message. Alternatively it may instruct all towers in areas 509 and 510 to broadcast the message, or the like. Similarly, if delivery company 104 elected to only send a message to home 502, it may send a message instructing all devices 200 in homes 501, 503, 504, and 505 to not receive the message. In other words, each device has a unique identifier so messages could be tailored to particular customers. Thus, messages could be packaged by NOC 102 such that only identified devices receive the message. This would be useful for advertisers 120 who may exist in area 509 but not in area 511 as the advertisers could target only the relevant locations.

Figure 6:
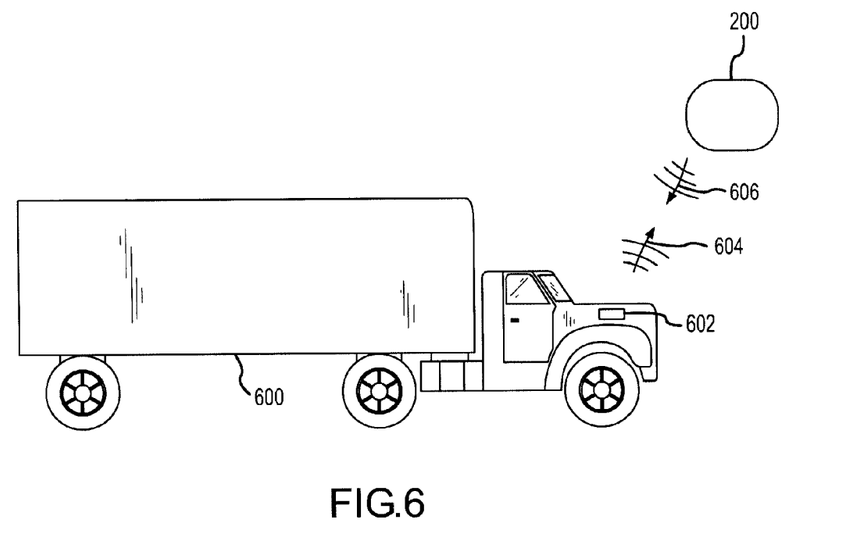
FIG. 6 is a diagrammatic representation of a delivery vehicle interacting with the system of FIG. 1.

As mentioned above, one advantage of pager or two way radio technology for device 200 is that a vehicle with a transmitter or receiver can broadcast information or poll device 200. Referring now to FIG. 6, a vehicle 600 is shown. Vehicle 600 has a radio 602. As vehicle 600 approaches home 108, radio 602 broadcasts or receives signals from device 200. Broadcast signals 604 from radio 602 may, for example, upload memory updates to device 200, such updates may include, for example, graphics, text, video, advertisements, programming changes, or the like. Signals 606 received from device 200 may include some of the demographic information outlined above and/or other demographic information, polling information regarding the status of device 200. Polling information may include minute viewing, whether and how much a device has been used over a period of time, operational status, or the like.

While the invention has been particularly shown and described with reference to an embodiment thereof, it will be understood by those skilled in the art that various other changes in the form and details may be made without departing from the spirit and scope of the invention.

What is claimed is:

1. A method for allowing a customer to initiate call center contact, the method comprising the steps of:
   receiving at a network operation center a message to be transmitted to a customer;
   initiating a communication with the customer by transmitting the message to a customer device;
   waiting for a reply from the customer that relates to the message;
   first determining whether the reply is received;
   if the reply is received, second determining whether the reply is a positive reply;
   if the reply is the positive reply, alerting a call center that the customer has indicated the positive reply; and
   providing customer contact information to the call center so the call center can contact the customer.

2. The method of claim 1, further comprising the step of composing the message to be sent to the customer.

3. The method of claim 2, further comprising the step of receiving from a company the message at the network operations center, where the company uses the call center to solicit purchases.

4. The method of claim 3, wherein the step of receiving from the company the message receives the message in a first protocol; and further comprising the step of converting the message from the first protocol to a second protocol wherein the second protocol is used to transmit the message to the customer.

5. The method of claim 1, wherein if it is determined the reply is not received, retransmitting the message to the customer.

6. The method of claim 1, further comprising the step of collecting demographic data.

7. The method of claim 1, wherein the reply is selected from the group of replies consisting of yes, affirmative, positive, no, negative, save, or discard.

8. The method of claim 1, further comprising the steps of:
receiving an advertising message at the network operation center from a third party for transmission to the customer;
transmitting the advertising message to the customer; and
receiving a response from the customer relating to the advertising message.

9. The method of claim 8, further comprising the step of collecting advertising demographic data based on the response.

10. The method of claim 1, wherein, the customer is a residential customer.

11. The method of claim 3, wherein the company is selected from a group of companies consisting of medical supply companies, grocery companies, retail companies, delivery companies, or office supply companies.

12. A method of transmitting messages from a company to a customer and receiving a reply from the customer indicative that the customer is receptive to being contacted by a call center, the method comprising the steps of:
composing a message to be transmitted to the customer;
transmitting the message to a network operation center;
packaging the message into a protocol capable of being delivered to the customer;
initiating a communication with the customer by delivering the message to a customer device of the customer in a manner that pushes the message to the customer;
displaying the message on the customer device;
generating a reply message from the customer using the customer device;
transmitting the reply from the customer to the network operation center;
receiving the reply from the customer; and
if the reply from the customer indicates the customer is receptive to being contacted, instructing a call center to contact the customer.

13. The method of claim 12, wherein the delivering the message step and the transmitting the reply step use a communication protocol selected from the group of communication protocols consisting of cellular protocols, network protocols, radio protocols, POTS, or pager protocols.

14. The method of claim 13, wherein the pager protocols include ReFLEX protocols.

15. The method of claim 12, further comprising broadcasting data from a delivery vehicle to the customer device.

16. The method of claim 12, further comprising polling the customer device using a radio located in a delivery vehicle.

17. A network operation center for delivering content to a customer and providing instruction to a call center that the customer is receptive to communication, the network operation center comprising:
a transmitter, the transmitter packages content and initiates a communication with the customer by transmitting the content to the customer without recquiring action on the customer's behalf;
a receiver, the receiver waits for a reply to the content transmitted to the customer;
a determinator, the determinator determines whether the reply is a positive reply; and
a notifier, the notifier delivers a notification to a call center when the determinator determines the replay is the positive reply, wherein
the notification from the notifier includes contact information of the customer.

18. The center of claim 17, wherein the notification further includes information regarding the content to which the customer sent the reply.

19. The center of claim 17, further comprising:
a storage device, the storage device stores, demographic data relating to at least one of the customer, the content, and the reply.

20. The center of claim 17, wherein the receiver receives third party advertising content from a third party advertiser and the transmitter packages the third party advertising and transmits the third party advertising to the customer, wherein the receiver also waits for an advertising reply.

21. The center of claim 17, wherein the transmitter and the receiver use a wireless protocol.

22. The center of claim 21, wherein the wireless protocol is a two way radio protocol.

23. The center of claim 21, wherein the wireless protocol is a pager protocol.

24. The center of claim 17, wherein the notifier delivers the notification over a network connection.

25. The center of claim 24, wherein the network connection is selected from a group of network connections consisting of: a LAN, a WAN, a WLAN, a WiFi, an Ethernet, or the Internet.

26. The center of claim 17, wherein the receiver receives the content from a company.

27. The center of claim 26, wherein, the receiver receives third party advertising content from a third party advertiser and the transmitter packages the third party advertising and transmits the third party advertising to the customer, wherein the receiver also waits for an advertising reply.

28. The center of claim 27, wherein the receiver comprises a plurality of receivers such that at least one of the plurality of receivers corresponds to a first communication protocol associated with the customer, a second communication protocol associated with the company, and a third communication protocol associated with the third party advertiser.

29. The center of claim 28, wherein the first communication protocol, the second communication protocol, and the third communication protocol are selected from the group of communication protocols consisting of: plain old telephone system, wireless cellular protocols, cabled network protocols, wireless network protocols, radio protocols, and pager protocols.

30. The center of claim 29, wherein the first communication protocol, the second communication protocol, and the third communication protocol are the same.

31. The center of claim 29, wherein the first communication protocol, the second communication protocol, and the third communication protocol are different.

32. The center of claim 31, wherein at least one of the first communication protocol, the second communication protocol, and the third communication protocol is different than the other two.

33. A system for allowing a customer of a company to initiate call center contact to solicit pre-orders, the system comprising:

a company;

a network operation center;

a customer; and a call center, wherein the company is connected to the network operation center by a first communication protocol;

the customer is connected to the network operation center by a second communication protocol;

the call center is connected to the network operation center by a third communication protocol; and the call center is connected to the customer by a fourth communication protocol, such that the company provides content to the network operation center for transmission to the customer using the first communication protocol;

the network operation center receives the content from the network operation center and initiates a communication with the customer by transmitting the content to the customer using the second communication protocol in a manner that pushes the message to the customer without requiring action on the customer's behalf;

the customer receives the content from the network operation center and transmits a reply to the content to the network operation center using the second communication protocol;

the network operation center receives the reply and determines whether the customer desires the call center to contact the customer;

if the network operation center determines the customer desires contact, the network operation center transmits a notification to the call center using the third communication protocol; and the call center receives the notification from the call center and contacts the customer using the fourth communication protocol.

34. The system of claim 33, wherein the company is a delivery company selected from the group of delivery companies consisting of: food delivery companies, medical supply delivery companies, and office supply delivery companies.

35. The system of claim 33, wherein the customer is selected from the group of customers consisting of: residential customers and commercial customers.

36. The system of claim 33, wherein the first communication protocol is selected from the group of communication protocols consisting of: plain old telephone system, wireless cellular protocols, cabled network protocols, wireless network protocols, radio protocols, and pager protocols.

37. The system of claim 33, wherein the second communication protocol is selected from the group of communication protocols consisting of: plain old telephone system, wireless cellular protocols, cabled network protocols, wireless network protocols, radio protocols, and pager protocols.

38. The system of claim 33, wherein the third communication protocol is selected from the group of communication protocols consisting of: plain old telephone system, wireless cellular protocols, cabled network protocols, wireless network protocols, radio protocols, and pager protocols.

39. The system of claim 33, wherein the fourth communication protocol is selected from the group of communication protocols consisting of: plain old telephone system, wireless cellular protocols, cabled network protocols, wireless network protocols, radio protocols, and pager protocols.

40. The system of claim 33, wherein the first communication protocol, the second communication protocol, the third communication protocol, and the fourth communication protocol are the same.

41. The system of claim 33, wherein at least one of the first communication protocol, the second communication protocol, the third communication protocol, and the fourth communication protocol is different than the other communication protocols.

42. The system of claim 33, wherein the network operation center records demographic data based on the reply.

43. The system of claim 33, wherein the notification includes customer contact information.

44. The system of claim 43, wherein the notification includes information regarding the content.

45. The system of claim 43, wherein the notification includes information regarding the reply.

46. The system of claim 43, wherein the notification includes information regarding the content and information regarding the reply.

47. The system of claim 33, further comprising:

a third party advertiser, the third party advertiser is connected to the network operation center by a fifth communication protocol, the third party advertiser provides advertising content to the network operation center to be transmitted to the customer using the second communication protocol and receives demographic data from the network operation center.

48. The system of claim 33, wherein the network operation center converts the content from the first communication protocol to the second communication protocol.

49. The system of claim 47, wherein the network operation center converts third party advertising from the fifth communication protocol to the second communication protocol.

50. The system of claim 33, wherein the delivery company provides the content by emailing the content to the network operation center.

51. The system of claim 33, wherein the delivery company provides the content to the network operation center through a network portal.

52. The system of claim 33, wherein the fourth communication protocol comprises a telephone call.

53. The system of claim 33, wherein the fourth communication protocol comprises an email.

\* \* \* \* \*